US011472328B2

(12) United States Patent
Bolton et al.

(10) Patent No.: US 11,472,328 B2
(45) Date of Patent: Oct. 18, 2022

(54) ADAPTER AND BOLSTERS FOR TRANSPORTING A CONTAINER

(71) Applicant: Fontaine Trailer Company LLC, Haleyville, AL (US)

(72) Inventors: Bart Bolton, Russellville, AL (US); Allen Peacock, Double Springs, AL (US); James Andrew Hendricks, Holly Pond, AL (US); Harold Painter, Haleyville, AL (US)

(73) Assignee: Fontaine Trailer Company LLC, Haleyville, AL (US)

( * ) Notice: Subject to any disclaimer, the term of this patent is extended or adjusted under 35 U.S.C. 154(b) by 557 days.

(21) Appl. No.: 16/520,063

(22) Filed: Jul. 23, 2019

(65) Prior Publication Data
US 2020/0031268 A1 Jan. 30, 2020

Related U.S. Application Data

(60) Provisional application No. 62/711,293, filed on Jul. 27, 2018.

(51) Int. Cl.
*B60P 7/08* (2006.01)
*B65D 88/54* (2006.01)

(52) U.S. Cl.
CPC .............. *B60P 7/0815* (2013.01); *B65D 88/54* (2013.01)

(58) Field of Classification Search
CPC ...... B62D 53/061; B62D 88/54; B65D 88/54; B60P 7/08
USPC .... 410/3, 76, 77, 78, 80, 82, 35, 72, 83, 46; 298/27
See application file for complete search history.

(56) References Cited

U.S. PATENT DOCUMENTS

| 6,210,088 B1* | 4/2001 | Crosby | B60P 7/132 |
| | | | 410/82 |
| 9,308,922 B2* | 4/2016 | Sain | B61D 3/20 |
| 10,518,828 B2* | 12/2019 | Oren | B60S 9/02 |
| 2006/0269379 A1* | 11/2006 | Orr | B60P 3/08 |
| | | | 410/46 |

FOREIGN PATENT DOCUMENTS

| CH | 608218 A5 | 12/1978 |
| DE | 7606291 U1 | 7/1976 |

\* cited by examiner

*Primary Examiner* — D Glenn Dayoan
*Assistant Examiner* — Sunsurraye Westbrook
(74) *Attorney, Agent, or Firm* — Levenfeld Pearlstein, LLC

(57) ABSTRACT

A container adapter for securing a container to a cargo section of a vehicle includes a frame, a plurality of brackets connected to the frame for securing the frame to the cargo section, and a plurality of locks formed on the frame configured to secure the frame to the container. The cargo section of the vehicle includes one or more attachments secured to a support surface, and at least two locks disposed on the attachments and spaced apart by a predetermined distance in a length direction. The at least two locks configured to engage the one or more containers. A trailer includes a cargo section having multiple bolsters, for use in the sand haul operation for example, the multiple bolsters including first, second and third bolsters spaced apart along a length direction, each bolster comprising two locks configured to engage a container. The second bolster is spaced from the first bolster by a first distance and the third bolster spaced from the first bolster by a second distance different than the first distance.

15 Claims, 4 Drawing Sheets

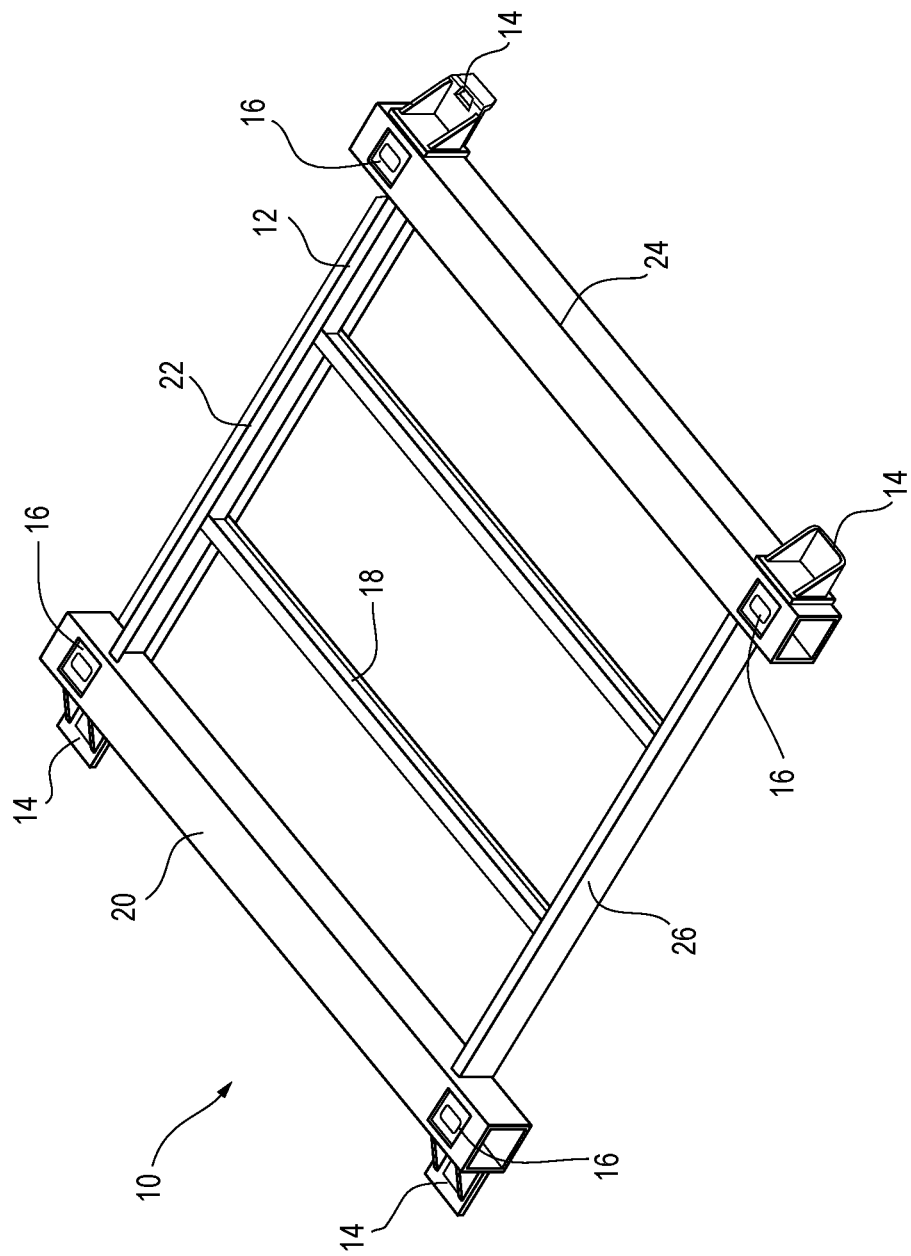

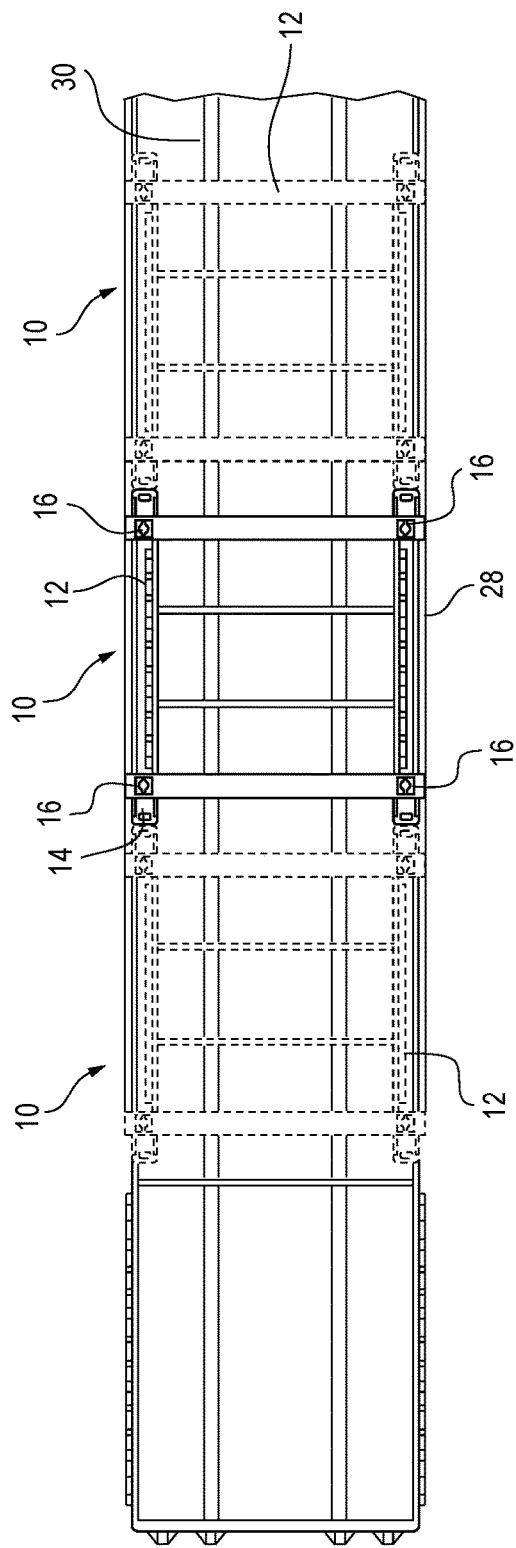
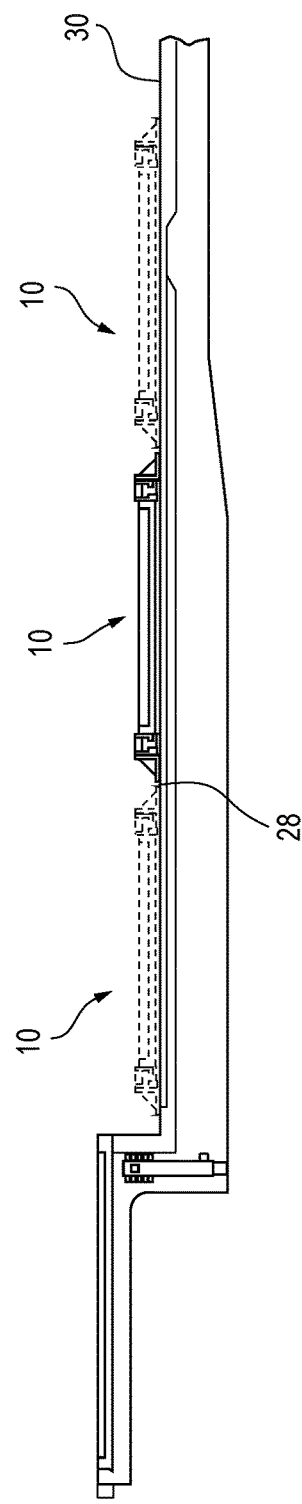

ADAPTER AND BOLSTERS FOR TRANSPORTING A CONTAINER

CROSS-REFERENCE TO RELATED APPLICATION DATA

This application claims the benefit of and priority to Provisional U.S. Patent Application Ser. No. 62/711,293, filed Jul. 27, 2018, titled "ADAPTER AND BOLSTERS FOR TRANSPORTING A CONTAINER" the entirety of which is incorporated herein by reference.

BACKGROUND

The present disclosure relates generally to transporting containers using, for example, an adapter or bolsters for accommodating differently sized containers on a cargo section of a vehicle.

A hydraulic fracturing process for obtaining fluids, such as petroleum, natural gas or natural gas liquids, from a well uses a material commonly referred to as "frac sand" in a pressurized fluid injected into the well. The frac sand must be transported to the hydraulic fracturing job site, typically in large quantities. Such an application is one example that utilizes specialized containers, referred to as "frac sand containers." Other applications may use different specialized containers.

Currently, frac sand containers are typically provided in two different sizes: 8 feet and 10 feet. However, it is difficult to securely mount and transport such containers on existing trailers or trucks in a timely manner, leading to costly downtime for the transporter. To this end, manufacturers have been developing specialized trailers or chassis equipment designed specifically for transporting frac sand containers of a particular size. However, the use of such specialized trailers or chassis requires transporters obtain the additional transporting equipment, i.e., the specialized trailers or chassis, which increases costs. Additionally, use of application-specific trailers or chassis may result in an inefficient allocation of fleet resources, as conventional or standard flatbed trailers or chassis may go unused in applications where the specialized trailers or chassis are required.

In addition, a known trailer, such an intermodal chassis, is designed to transport elongated shipping containers of standard sizes. A common size for a shipping container is 40 ft. in length. Thus, a known intermodal chassis may be designed to have a load from the shipping container distributed substantially along its length, thereby reducing sections of increased load along the intermodal chassis. Accordingly, such an intermodal chassis may be designed having a relatively lighter weight. However, such an intermodal chassis may not be suitable for transporting containers of reduced length and increased load, because such containers may produce localized areas of increased load on the relatively light weight intermodal chassis.

Accordingly, it is desirable to retrofit an existing cargo section of a vehicle to allow frac sand containers, or other containers, of different sizes to be quickly secured to the cargo section for transport. Further, it may be desirable to provide a removable adapter which may be secured to the cargo section for securing a specific container to the cargo section for transport, and removed from the cargo section allowing for other containers or freight to be secured to or positioned on the cargo section for transport. It may also be desirable to provide a cargo section, for example, on a trailer, having varying load capacities along its length.

SUMMARY

According to an embodiment, a container adapter for securing a container to a cargo section of a vehicle, such as a trailer, includes a frame, a plurality of brackets connected to the frame configured for securing the frame to the cargo section, and a plurality of load securing devices, such as locks, formed on the frame configured to secure the frame to the container.

According to another embodiment, a cargo section of a vehicle, such as a trailer, is configured to support one or more containers on a support surface, and the cargo section includes one or more attachments secured to the support surface, and at least two locks disposed on the attachments and spaced apart by a predetermined distance in a length direction of the support surface. The at least two locks are configured to engage the one or more containers.

In one embodiment, the one or more attachments includes a frame having a plurality of brackets secured to and removable from the support surface. The one or more attachments may include a plurality of the frames. In another embodiment, the one or more attachments include a plurality of bolsters spaced apart along a length of the support surface.

According to one embodiment, a trailer includes a cargo section having a plurality of bolsters spaced apart along a length direction, each bolster having two locks configured to engage a container. The plurality of bolsters include a first bolster, a second bolster spaced from the first bolster by a first distance, and a third bolster spaced from the first bolster by a second distance different than the first distance. The first and second bolsters are configured to accommodate and secure a first container having a first size on the cargo section and the first and third bolsters are configured to accommodate and secure a second container having a second size, different than the first size, on the cargo section.

These and other features and advantages of the present invention will be apparent from the following detailed description, in conjunction with the appended claims.

BRIEF DESCRIPTION OF THE DRAWINGS

FIG. 1 is a perspective view of a container adapter, according to an embodiment;

FIG. 2 is a plan view of a cargo section of a vehicle retrofitted with the container adapter of FIG. 1;

FIG. 3 is a side view of the vehicle cargo section of FIG. 2;

DETAILED DESCRIPTION

Figure 4:
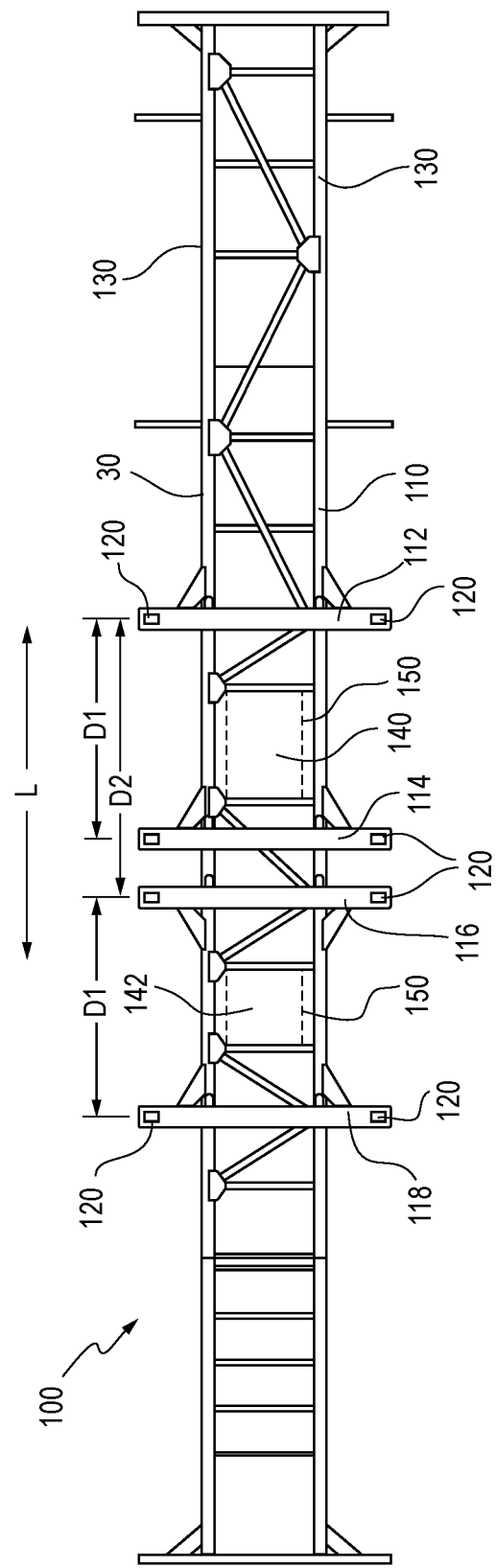
FIG. 4 is a plan view of a trailer configured for transporting a container, according to an embodiment.

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

FIG. 1 is a perspective view of a container adapter 10 for securing a container on a cargo section of a transport vehicle, such as a trailer. The container adapter 10 includes a frame 12 having one or more brackets 14 configured for securing the frame 12 to the cargo section. The frame 12 also includes one or more locks 16, or load securing devices, configured for securing the frame 12 to the container. The one or more locks 16 may be a known type of lock, such as a container twist lock. The container adapter 10 may further include one or more support braces 18 extending across the frame 12. In one embodiment, the frame 12 may be formed by a plurality of structural sections 20, 22, 24, 26, such as beams, secured together to form a generally quadrilateral shape.

FIG. 2 is a plan view of a vehicle (such as a trailer) cargo section 28 retrofitted with the container adapter 10, and FIG. 3 is a side view of the cargo section 28 of FIG. 2, according to an embodiment. Referring to FIGS. 1-3, the container adapter 10 is configured to be secured to a standard or conventional cargo section. The cargo section 28 may be, for example, a flatbed section of a truck, a deck of a trailer or a beam of a trailer including beams of a chassis trailer, and have a support surface 30 for supporting the one or more containers.

In one embodiment, the one or more brackets 14 are configured to secure the frame 12 to the cargo section 28, for example by receiving a suitable fastener connected to the cargo section 28. One such suitable fastener is a conventional container lock, such as a twist lock, installed on the cargo section 28. However, other suitable fasteners are envisioned as well. References numbers identifying some locks 16 and bracket 14 may be omitted from the figures for clarity.

The container adapter 10 may be secured to the container with the one of the locks 16. The one or more locks 16 are configured to engage corresponding locking elements (not shown) on the container. Accordingly, the one or more locks 16 are located on the frame 12 at positions which correspond to positions of the corresponding locking elements of the container. The one or more locks 16 may be formed as, for example, openings configured to receive a portion of the container, a hook movable to engage the container, or other similar, suitable lock configured to engage a portion of a predetermined container.

Accordingly, the container adapter 10 may secure the container to the cargo section 28. The one or more locks 16 and the one or more brackets 14 are also configured to be released from the container and the cargo section 28, respectively, such that the container adapter 10 may be removed from the cargo section 28 and the container. Thus, with the container adapter 10 removed, the cargo section 28 may be used for conventional transport operations.

The container adapter 10 may be manufactured in different sizes to accommodate differently sized containers. For example, the container may be a frac sand container, typically manufactured in an 8 foot size or a 10 foot size. The container adapter 10, in one embodiment, may be manufactured with the frame 12 having a length of approximately 8 feet to accommodate the 8 foot container. In another embodiment, the container adapter 10 may be manufactured with the frame 12 having a length of approximately 10 feet to accommodate the 10 foot container. It is envisioned that the container adapter 10 may be manufactured in other sizes as well, depending on a container size. It is also understood that the size of the frame 12 is not necessarily the same as the container, so long as the frame 12 is sufficiently sized to engage predetermined portions of a particular container. Further, while the example above refers to a frac sand container, it is understood that the subject matter of the present application is not limited for use with frac sand containers, and that other type of containers, including other containers which may be provided in varying sizes, are envisioned as well.

In one embodiment, the cargo section 28 may have multiple container adapters 10 secured thereon. The container adapters 10 may also be provided in different sizes on the cargo section 28 to facilitate the transport of differently sized containers. In one embodiment, the container adapter 10 may be configured for use multiple ISO container style devices.

A trailer having the cargo section 28 may be a commercial trailer, and the cargo section 28 of a truck may be a flatbed section of a medium or heavy-duty truck.

Figure 5:
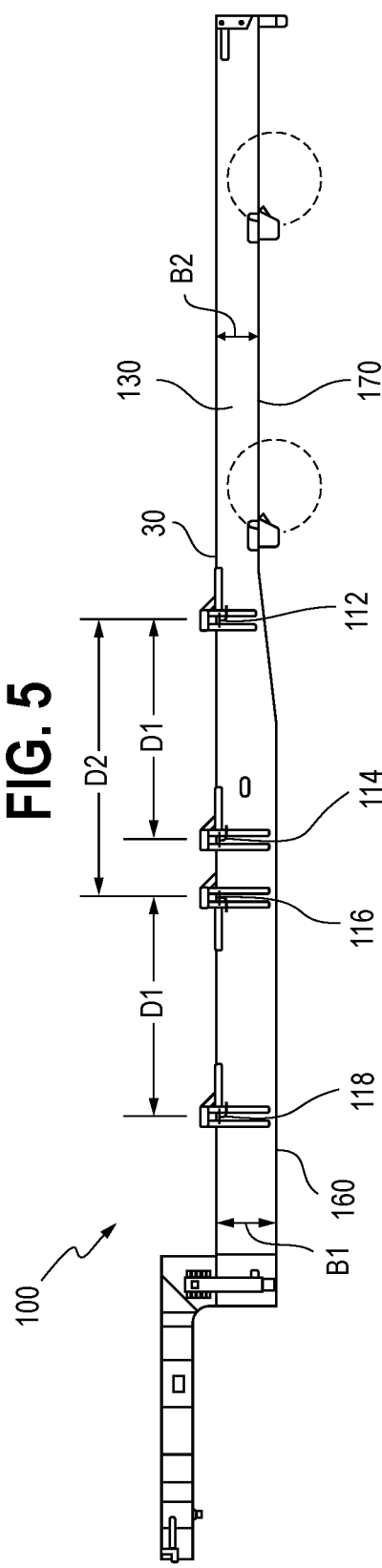
FIG. 5 is a side view of the trailer of FIG. 4.
Figure 6:
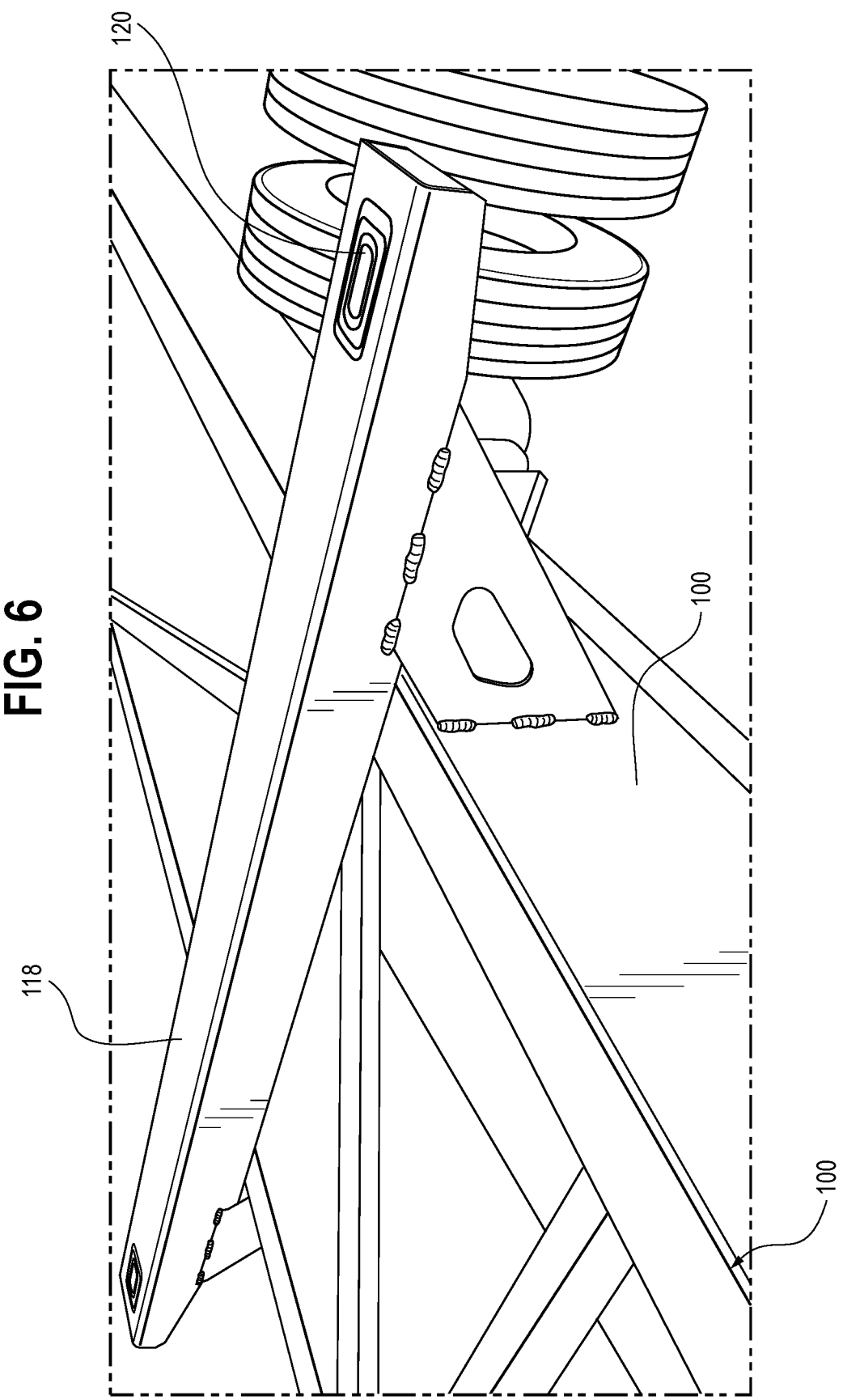
FIG. 6 is a perspective view showing a portion of the trailer of FIG. 4.

FIG. 4 is a plan view of a trailer 100 configured for transporting one or more containers, according to an embodiment, and FIG. 5 is a side view of the trailer 100 of FIG. 4. FIG. 6 is a perspective view showing a portion of the trailer 100.

Referring to FIGS. 4-6, in one embodiment, the trailer 100 includes a cargo section 110 having the support surface 30 configured for supporting cargo and a plurality of bolsters 112, 114, 116, 118 extending in a transverse direction of the trailer 100 and spaced apart along a length direction L of the trailer. In one embodiment, the plurality of bolsters includes a first bolster 112, a second bolster 114, a third bolster 116 and a fourth bolster 118. However, it is understood that the present disclosure is not limited to this embodiment and that the number of bolsters may vary.

In one embodiment, each bolster 112, 114, 116, 118 may include a bolster lock assembly 120 configured to engage corresponding locking elements (not shown) on the container. Accordingly, the bolster lock assemblies 120 are located on the bolsters 112, 114, 116, 118 at positions which correspond to positions of the corresponding locking elements of the container. Additionally, at least two bolster lock assemblies 120, formed on respective bolsters, are spaced apart from one another in the length direction L. The bolster lock assemblies 120 may be formed as, for example, a hook configured to engage the container, an opening configured to receive at a portion of the container, or other similar, suitable lock configured to engage a portion of a predetermined container. In one embodiment, the bolster lock assembly 120 may include a twist lock. In one embodiment, each bolster 112, 114, 116, 118 may include two bolster lock assemblies 120 spaced apart by a distance corresponding to a width of a predetermined container, or a distance between corresponding locking elements of the predetermined container.

In one embodiment, the bolsters 112, 114, 116, 118 are positioned along a length L of the trailer 100 such that containers of different sizes may be accommodated on and secured to the bolsters 112, 114, 116, 118. For instance, in one embodiment, the bolsters 112, 114, 116, 118 may include at least two bolsters spaced apart by a first distance D1 to accommodate and secure a container of a first size, and at least two bolsters spaced apart by a second distance D2 to accommodate and secure a container of a second size.

By way of a non-limiting example, the container may be a frac sand container. Frac sand containers are typically provided in either an 8 foot size or 10 foot size. In one embodiment, the first bolster 112 and the second bolster 114 may be spaced apart by approximately 8 feet to accommodate and secure the 8 foot container. Likewise, in one embodiment, the third and fourth bolsters 116, 118 may be spaced apart by approximately 8 feet to accommodate and secure another 8 foot container. In addition, the second and fourth bolsters 114, 118 may be spaced apart by approximately 10 feet to accommodate and secure the 10 foot container. However, it is understood that the bolsters 112, 114, 116, 118 may be spaced apart by other distances to accommodate containers of different sizes or having different locations of corresponding locking elements to be engaged by the bolster lock assemblies 120. It also understood that the bolsters 112, 114, 116, 118 are not limited for use with frac sand containers, and that other containers are envisioned as well.

Accordingly, in the embodiments above, containers of different sizes may be accommodated and secured on the trailer 100 by way of the bolsters 112, 114, 116, 118 arranged along the cargo section 110.

In one embodiment, the trailer 100 may be retrofitted to include the bolsters 112, 114, 116, 118 in the manner described above. For example, the plurality of bolsters 112, 114, 116, 118 may be welded or otherwise suitably secured to the trailer 100 at predetermined positions to accommodate containers of different sizes.

Accordingly, the embodiments above, a cargo section 28, 110 may be retrofitted to accommodate and secure containers of different sizes for transport. For example, one or more attachments, such as the frame 12 or bolsters 112, 114, 116, 118 may be secured to the support surface 30 of the cargo section 28, 110, the attachments configured to accommodate and secure the one or more containers on the cargo section 28, 110. The cargo section 28, 110 may be formed on, for example, a trailer or a flatbed section of a truck.

Referring again to FIG. 4, in one embodiment, the trailer 100 may include at least one opening 140, 142 through the support surface 30. In one embodiment, the at least one opening 140, 142 includes a plurality of openings, such as a first opening 140 and a second opening 142. It is understood, however, that fewer or additional openings may be provided depending on an intended application of the trailer 100.

Each opening 140, 142 may be disposed between longitudinal trailer beams 130 and a pair of bolsters. In one embodiment, each opening 140, 142 may be substantially centered between a particular pair of bolsters. For example, in one embodiment, the first opening 140 may be substantially centered between first and third bolsters 112, 116, along the second distance D2. Alternatively, or in addition, in one embodiment, the second opening 142 may be substantially centered between the third and fourth bolsters 116, 118, along the first distance D1.

In one embodiment, media may be discharged from a container disposed on the trailer 100 through the at least one opening 140, 142, without removing the container. For example, frac sand may be discharged from a lower end of a frac sand container through the at least one opening 140, 142. A size, such as a width, of the openings 140, 142 may be varied during manufacture depending on an intended application of the trailer 100.

In one embodiment, the trailer 100 may be fitted with a guide structure 150 configured for guiding discharge of the media through the at least one opening 140, 142. For example, the guide structure 150 may be a chute or similar structure having a desired shape configured to direct a flow of the media discharged from the container. In one embodiment, the guide structure 150 may be substantially trapezoidal or circular in shape but is not limited thereto. A transverse dimension of the guide structure 150 may vary along a length of the guide structure 150, such that the guide structure 150 is generally tapered. In one embodiment, the guide structure 150 may be curved or angled. In one embodiment, the guide structure 150 may be fitted to or at least partially within an opening of the at least one opening 140, 142. The guide structure 150 may be secured to the trailer 100 using a known, suitable fastening technique, including, but not limited to, mechanical fasteners, interlocking fit or interference fit. The guide structure 150 includes opposed open ends to facilitate passage of the media therethrough.

Referring again to FIG. 5, in one embodiment, the trailer 100 may be configured to support different loads along its length, including localized areas of increased load. For example, in one embodiment, the trailer 100 may include a first section 160 configured to support cargo, such as one or more containers, having a first capacity, and a second section 170 configured to support cargo having a second capacity different than the first capacity, or alternatively, not configured support additional cargo.

For example, in one embodiment, the trailer 100 may be configured to support one or more containers along a concentrated length. For instance, the first section 160 may be configured to support one or more containers exceeding, for example, 50,000 lbs., over a length of 8 feet, or more, along the trailer 100. The trailer 100 may be configured in such a manner, for example, by designing the longitudinal trailer beams 130 to have a predetermined depth along the first section 160, by designing a flange of the trailer to have a predetermined width and thickness, or by using different, suitable materials to construct the trailer 100, based on a strength of the materials, or any combination thereof. That is, the first section 160 of the trailer 100 may be designed to have a first load capacity and the second section 170 of the trailer may be designed to have a second load capacity, different from the first load capacity. Additional sections of varying load capacity are envisioned as well. In one embodiment, the trailer 100 is designed to support heavy concentrated loads which may be significantly different than traditional "Intermodal" style chassis, which are designed to transport rigid elongated containers. In one embodiment, the plurality of bolsters are positioned along the first section 160. In one embodiment, no bolsters are positioned on the second section 170.

As shown in FIG. 5, in one embodiment, the first section 160 may be formed having a first beam depth B1 configured to support a predetermined load, such as a load corresponding to the capacity or capacities of one or more predetermined containers. The second section 170 may be formed having a second beam depth B2, different than the first beam depth B1. For example, the second beam depth B2 may be less than the first beam depth B1. Accordingly, in one embodiment, the second section 170 may be designed to support a lower load than the first portion 160. However, as detailed above, other parameters, such as material or flange width and thickness, may be varied to vary a load capacity of the trailer 100 along its length. Although the examples above refer to a trailer 100, it is understood that such features may be applied to a vehicle chassis as well. In one embodiment, the trailer 100 may be a chassis trailer.

Features from any one of the embodiments described above may be implemented in, combined or used together with, or replace features from any of the other embodiments described above. That is, it is to be understood the various features from any of the embodiments above are usable together with the other embodiments described herein.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A container adapter for securing a container to a cargo section of a vehicle, the container adapter comprising:
a frame having a first pair of structural sections in a first orientation longitudinal to the cargo section and second pair of structural sections transverse to the first pair of structural sections;
a plurality of braces extending between and transverse to the first pair of structural sections and parallel to the second pair of structural sections;
a plurality of brackets connected to the frame at the second structural sections configured for securing the frame to the cargo section; and
a plurality of load securing devices formed on the frame configured to secure the frame to the container.

2. A cargo section of a vehicle configured to support one or more containers on a support surface, the cargo section comprising:
one or more attachments secured to the support surface; and
at least two locks disposed on the attachments and spaced apart by a predetermined distance in a length direction of the support surface, the at least two locks configured to engage the one or more containers,
wherein the one or more attachments includes a frame having a plurality of brackets secured to and removable from the support surface,
wherein the one or more attachments includes a plurality of the frames, and
wherein the plurality of frames includes a first frame having a first size and a second frame having a second size different from the first size.

3. The cargo section of claim 2, wherein the one or more attachments include a plurality of bolsters spaced apart along a length of the support surface.

4. The cargo section of claim 3, wherein the plurality of bolsters includes a first bolster, a second bolster and a third bolster.

5. The cargo section of claim 4, wherein the second bolster is spaced from the first bolster by a first distance and the third bolster is spaced from the first bolster by a second distance, different than the first distance.

6. The cargo section of claim 5, wherein the first and second bolsters are configured to accommodate and secure a first container having a first size on the cargo section and the first and third bolsters are configured to accommodate and secure a second container having a second size, different than the first size, on the cargo section.

7. A trailer comprising:
a cargo section having a plurality of bolsters spaced apart along a length direction, each bolster comprising two locks configured to engage a container; wherein the plurality of bolsters include:
a first bolster;
a second bolster spaced from the first bolster by a first distance; and
a third bolster spaced from the first bolster by a second distance different than the first distance, and
wherein the first and second bolsters are configured to accommodate and secure a first container having a first size on the cargo section and the first and third bolsters are configured to accommodate and secure a second container having a second size, different than the first size, on the cargo section.

8. The trailer of claim 7, further comprising a fourth bolster spaced from the third bolster by the first distance.

9. The trailer of claim 7, further comprising:
at least one opening configured to allow passage therethrough of media discharged from one of the first container and the second container.

10. The trailer of claim 9, wherein the at least one opening is approximately centered along the first length.

11. The trailer of claim 9, wherein the at least one opening is approximately centered along the second length.

12. The trailer of claim 9, further comprising a pair of spaced apart longitudinal beams, wherein the plurality of bolsters extend across the longitudinal beams.

13. The trailer of the claim 7, further comprising a first section having a first load capacity and a second section having a second load capacity different from the first load capacity, the first and second sections arranged along the length direction.

14. The trailer of claim 13, wherein the spaced apart longitudinal beams have a first beam depth along the first section and a second beam depth along the second section, different from the first beam depth.

15. The trailer of claim 13, wherein the plurality of bolsters are formed on the first section.

* * * * *